United States Patent
Hwang et al.

(10) Patent No.: US 9,900,811 B2
(45) Date of Patent: Feb. 20, 2018

(54) METHOD FOR RECEIVING DATA FROM AMORPHOUS MIMIC CELL AND TERMINAL THEREOF

(71) Applicant: LG ELECTRONICS INC., Seoul (KR)

(72) Inventors: Daesung Hwang, Seoul (KR); Yunjung Yi, Seoul (KR); Kijun Kim, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,586

(22) PCT Filed: Sep. 2, 2015

(86) PCT No.: PCT/KR2015/009243
§ 371 (c)(1),
(2) Date: Jan. 6, 2017

(87) PCT Pub. No.: WO2016/036133
PCT Pub. Date: Mar. 10, 2016

(65) Prior Publication Data
US 2017/0208513 A1    Jul. 20, 2017

Related U.S. Application Data

(60) Provisional application No. 62/046,181, filed on Sep. 5, 2014.

(51) Int. Cl.
*H04W 36/00* (2009.01)
*H04L 5/00* (2006.01)
(Continued)

(52) U.S. Cl.
CPC ....... *H04W 36/0083* (2013.01); *H04L 5/0051* (2013.01); *H04W 24/02* (2013.01); *H04L 27/2601* (2013.01)

(58) Field of Classification Search
CPC ... H04M 1/72519; H04W 8/12; H04W 16/18; H04B 1/707
(Continued)

(56) References Cited

U.S. PATENT DOCUMENTS 9,608,785 B2 * 3/2017 Kim ..................... H04L 5/0048
2010/0267373 A1   10/2010 Engström
(Continued)

FOREIGN PATENT DOCUMENTS

WO   WO 2013/048216 A1   4/2013
WO   WO 2013/051832 A2   4/2013
WO   WO 2014/126445 A1   8/2014

OTHER PUBLICATIONS

3GPP TS 36.211 V10.4.0 (Dec. 2011); 3rd Generation Partnership Project; Technical Specification Group Radio Access Network; Evolved Universal Terrestrial Radio Access (E-UTRA); Physical Channels and Modulation (Release 10); pp. 1-101.

*Primary Examiner* — Danh Le
(74) *Attorney, Agent, or Firm* — Birch, Stewart, Kolasch & Birch, LLP

(57) ABSTRACT

One embodiment of the present specification provides a data channel reception method. The method can comprise the steps of: receiving, from a first cell, a cell-specific reference signal (CRS) and a data channel; receiving, from a second cell, configuration information of an MBMS over a single frequency network (MBSFN) subframe according to the movement from the first cell to the second cell; receiving, from the second cell, the CRS and the data channel of the first cell on at least one MBSFN subframe according to the configuration information; and demodulating the data channel received from the second cell on the basis of the CRS of the first cell received from the second cell.

8 Claims, 15 Drawing Sheets

(51) Int. Cl.
*H04W 24/02* (2009.01)
*H04L 27/26* (2006.01)

(58) Field of Classification Search
USPC ............. 455/446, 433, 550.1; 370/335
See application file for complete search history.

(56) References Cited

U.S. PATENT DOCUMENTS

| | | |
|---|---|---|
| 2011/0256883 A1* | 10/2011 | Park .................. H04W 60/04 455/456.1 |
| 2012/0201164 A1 | 8/2012 | Jöngren et al. |
| 2014/0029484 A1* | 1/2014 | Choi .................. H04J 3/1694 370/280 |
| 2014/0105095 A1 | 4/2014 | Lee et al. |
| 2014/0105468 A1* | 4/2014 | Kawashita ............ H04N 5/77 382/118 |
| 2014/0140237 A1* | 5/2014 | Ma .................. H04W 24/08 370/252 |
| 2014/0206341 A1* | 7/2014 | Siomina ........... H04W 36/0088 455/422.1 |
| 2015/0146692 A1* | 5/2015 | Yi .................. H04W 36/0055 370/331 |
| 2015/0358848 A1* | 12/2015 | Kim .................. H04W 24/10 370/252 |
| 2016/0157246 A1* | 6/2016 | Suzuki ................. H04L 5/005 370/329 |
| 2016/0164645 A1* | 6/2016 | Suzuki ................. H04L 5/005 370/312 |
| 2016/0323846 A1* | 11/2016 | Park .................. H04W 4/08 |

* cited by examiner

Antenna 0

METHOD FOR RECEIVING DATA FROM AMORPHOUS MIMIC CELL AND TERMINAL THEREOF

CROSS REFERENCE TO RELATED APPLICATIONS

This application is the National Phase of PCT International Application No. PCT/KR2015/009243, filed on Sep. 2, 2015, which claims priority under 35 U.S.C. 119(e) to U.S. Provisional Application No. 62/046,181, filed on Sep. 5, 2014, all of which are hereby expressly incorporated by reference into the present application.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in a next-generation mobile communication system, a small cell having a narrow cell coverage is expected to be added to the coverage of the existing cell and to process more traffics.

However, suppose that a significantly large number of small cells are arranged in a specific area and that an UE moves within the specific area. Then, the UE has to perform handover frequently. Thus, overhead may be caused by a handover procedure.

SUMMARY OF THE INVENTION

Accordingly, a disclosure of the present specification has been made in an effort to solve the aforementioned problem.

In order to achieve the aforementioned object, an embodiment of the present disclosure suggests a scheme of operating a plurality of small cells as a single large cell. In the present disclosure, such a scheme is referred to as a amorphous cell.

As a scheme of operating the plurality of small cells as a single large cell, an embodiment of the present disclosure suggests a specific cell which emulates a target cell and operates as the target cell.

In order to achieve the aforementioned object, one embodiment of the present disclosure provides a method of receiving a data channel. The method includes: receiving, from a first cell, a cell-specific reference signal (CRS) and a data channel; receiving, from a second cell, configuration information of a MBMS over a Single Frequency Network (MBSFN) subframe according to a movement from the first cell to the second cell; receiving, from the second cell, the CRS and the data channel of the first cell on at least one MBSFN subframe according to the configuration information; and demodulating the data channel, which is received from the second cell, based on the CRS of the first cell, which is received from the second cell.

The method may further include receiving, from the second cell, a CRS of the second cell on a normal subframe other than the MBSFN subframe.

The method may further include receiving the CRS of the second cell on first n number of OFDM symbols of the MBSFN subframe.

The method may further include receiving emulation cell configuration information from the second call.

The receiving, from the second cell, the CRS and the data channel of the first cell and the demodulating of the data channel may be performed only when the emulation cell configuration information verifies that the second cell is able to operate as an emulation cell.

In order to achieve the aforementioned object, one embodiment of the present disclosure provides a user equipment (UE) which receives a data channel. The UE includes a Radio Frequency (RF) unit; and a processor configured to control the RF unit. The processor performs: receiving, from a first cell, a cell-specific reference signal (CRS) and a data channel; receiving, from a second cell, configuration information of an MBMS over a Single Frequency Network (MBSFN) subframe according to a movement from the first cell to the second cell; receiving, from the second cell, the CRS and the data channel of the first cell on at least one MBSFN subframe according to the configuration information; and demodulating the data channel, which is received from the second cell, based on the CRS of the first cell, which is received from the second cell.

According to embodiments of the present disclosure, the above problem of the existing technology may be solved.

DESCRIPTION OF EXEMPLARY EMBODIMENTS

Figure 1:
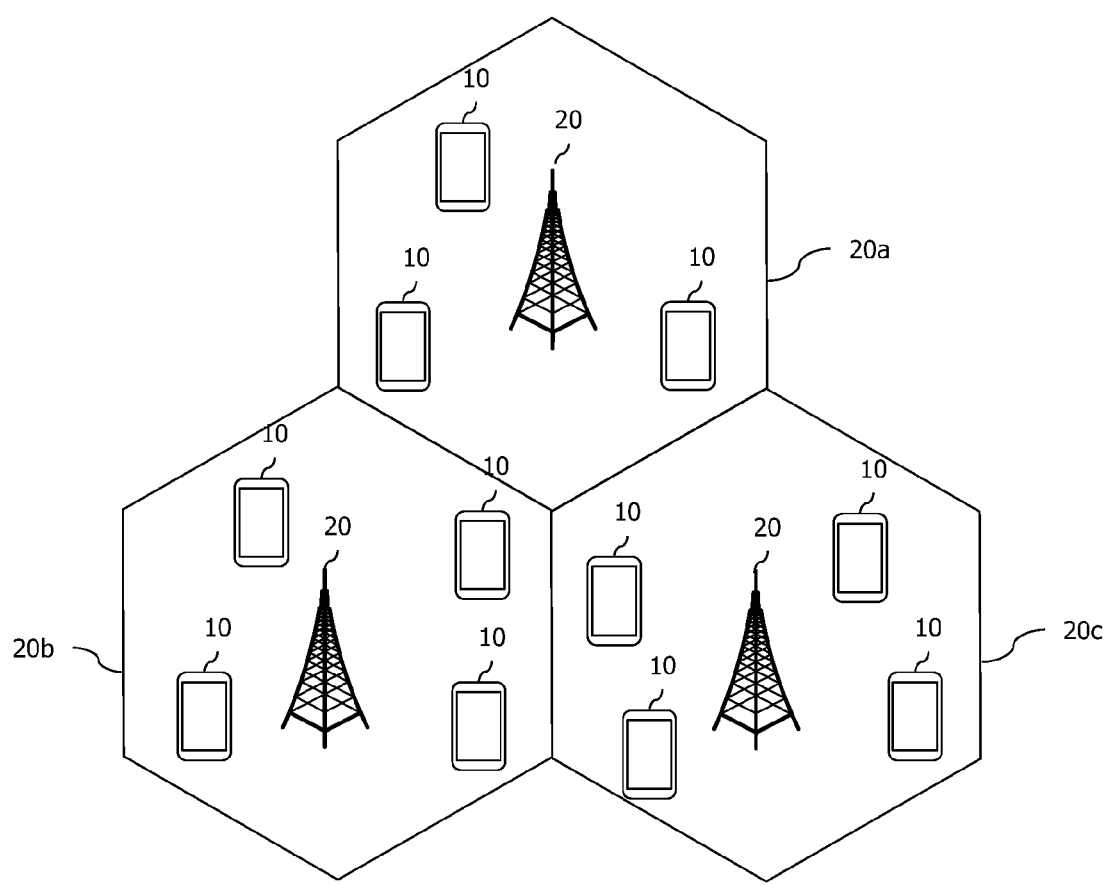
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LIE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
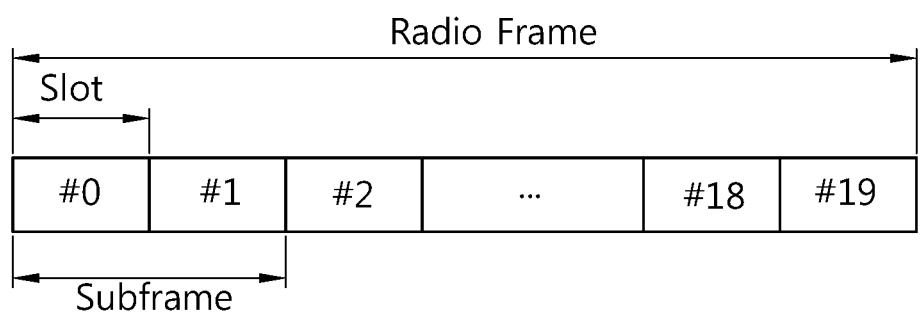
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
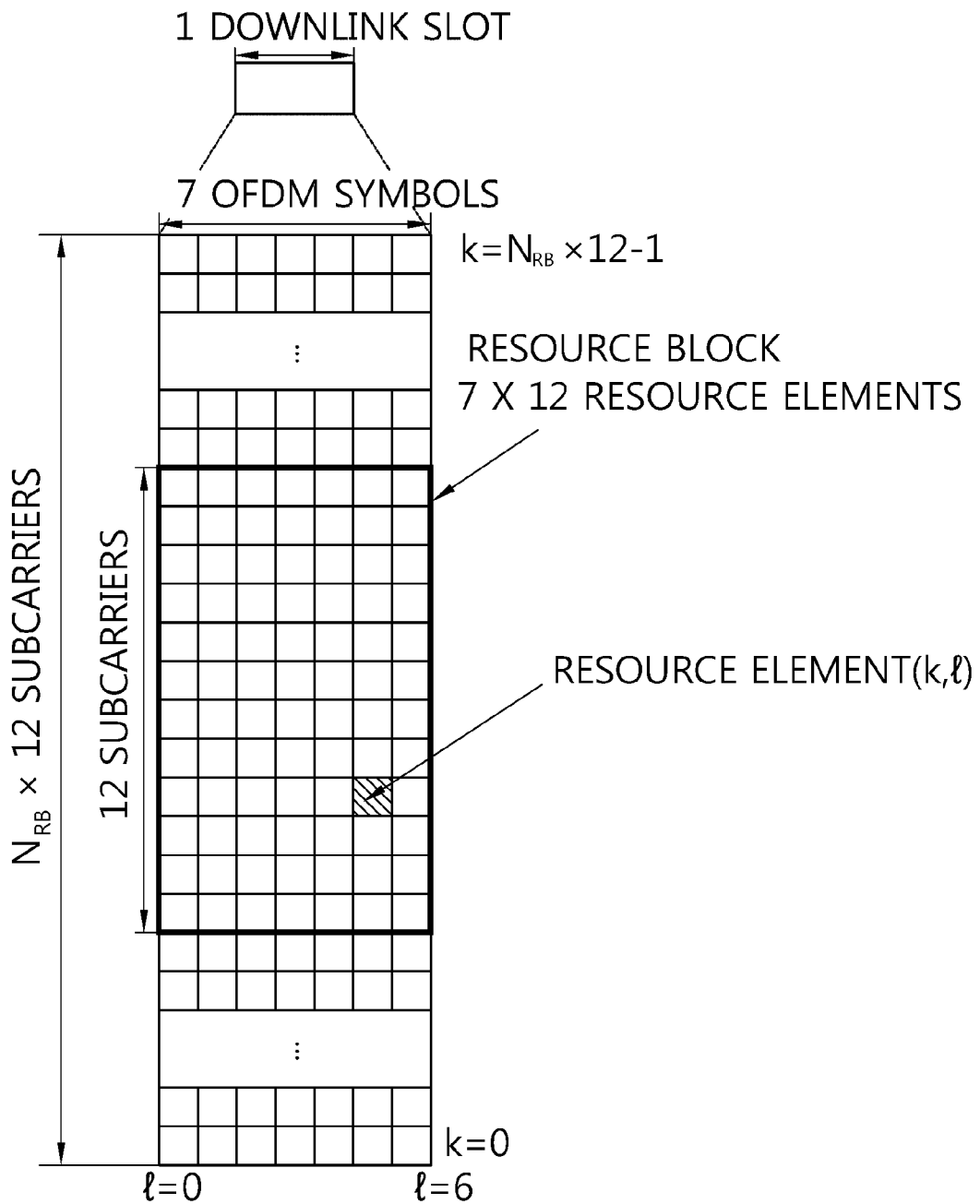
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
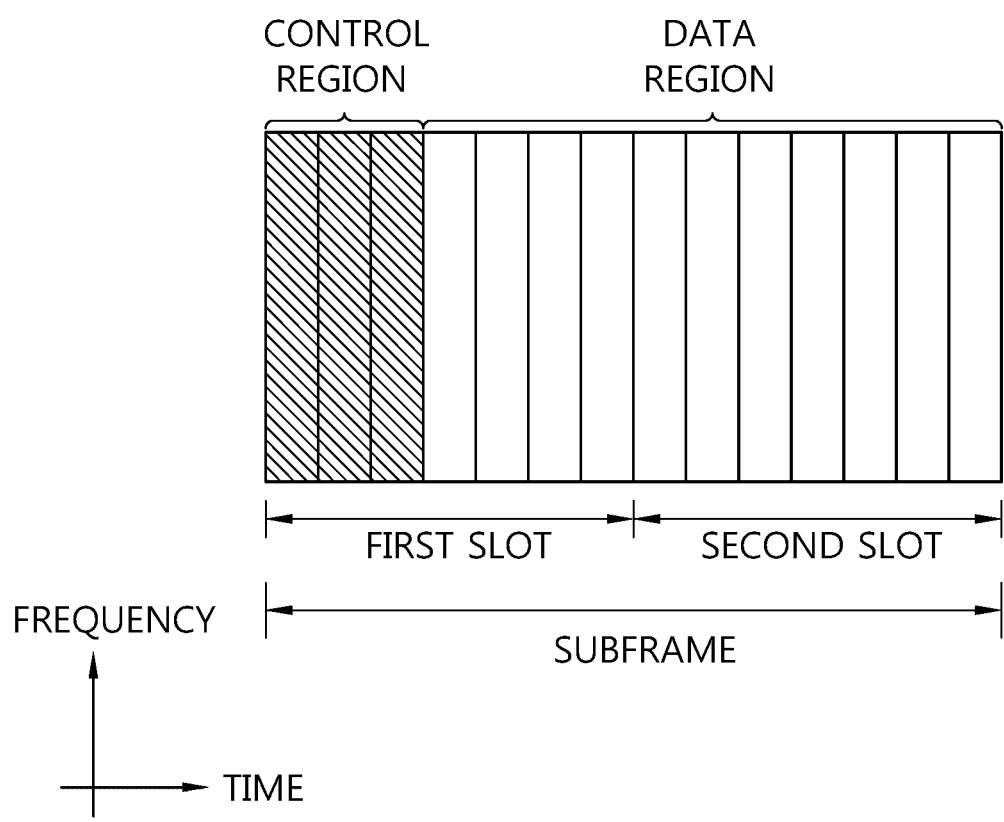
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 1

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports-is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 2

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |

TABLE 2-continued

| DCI format | Contents |
|---|---|
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

The uplink channels include a PUSCH, a PUCCH, an SRS (Sounding Reference Signal), and a PRACH (physical random access channel).

Figure 5:
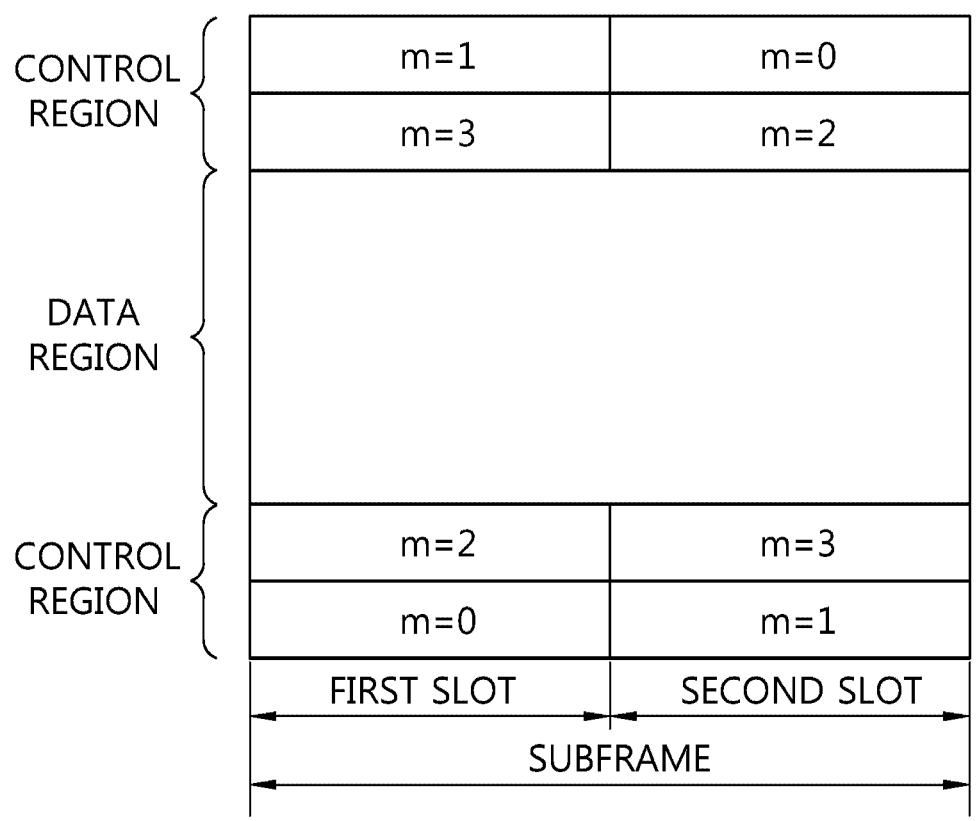
FIG. 5 illustrates the architecture of an uplink subframe in 3GPP LTE.
Figure 5:
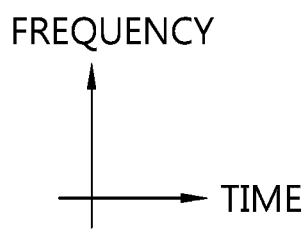

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Reference Signal>

Meanwhile, a reference signal (RS) is hereinafter described.

In general, transmission information, i.e., data, is easily distorted or changed when transmitted through a wireless channel. Thus, to demodulate the transmission information without an error, a reference signal is needed. The reference signal is a signal well known between a transmitter and a receiver, and transmitted along with transmission information. Transmission information transmitted by the transmitter goes through various channels corresponding to transmission antennas or layers, and therefore, the reference signal may be allocated to each transmission antenna or layer. A reference signal for each transmission antenna or layer may be distinguishable using a resource such as time, frequency, or code. The reference signal may be used for two purposes: demodulation of transmission information and channel estimation.

A downlink reference signal may be classified as a cell-specific RS (CRS), MBMS over a Single Frequency Network (MBSFN) RS, a UE-specific RS (URS), a positioning RS (PRS), or a CSI-RS. The CRS is an RS transmitted to every UE in a cell, and may be referred to as a common reference signal. The CRS may be used for channel estimation in response to a CQI feedback and channel estimation for a PDSCH. The MBSFN RS may be transmitted to a subframe allocated to transmit a MBSFN. The URS is a reference signal received by a specific UE or a specific UE group in a cell, and may be referred to as a demodulation RS (DM-RS). The DM-RS is primarily used for data demodulation by a specific UE or a specific UE group. The PRS may be used for estimation of a location of an UE. The CSI-RS is used for estimation of a channel for a PDSCH of an LTE-A UE. The CSI-RS is sparsely arranged in frequency domain or time domain, and may be punctured in a data region of a normal subframe or an MBSFN subframe.

Figure 6:
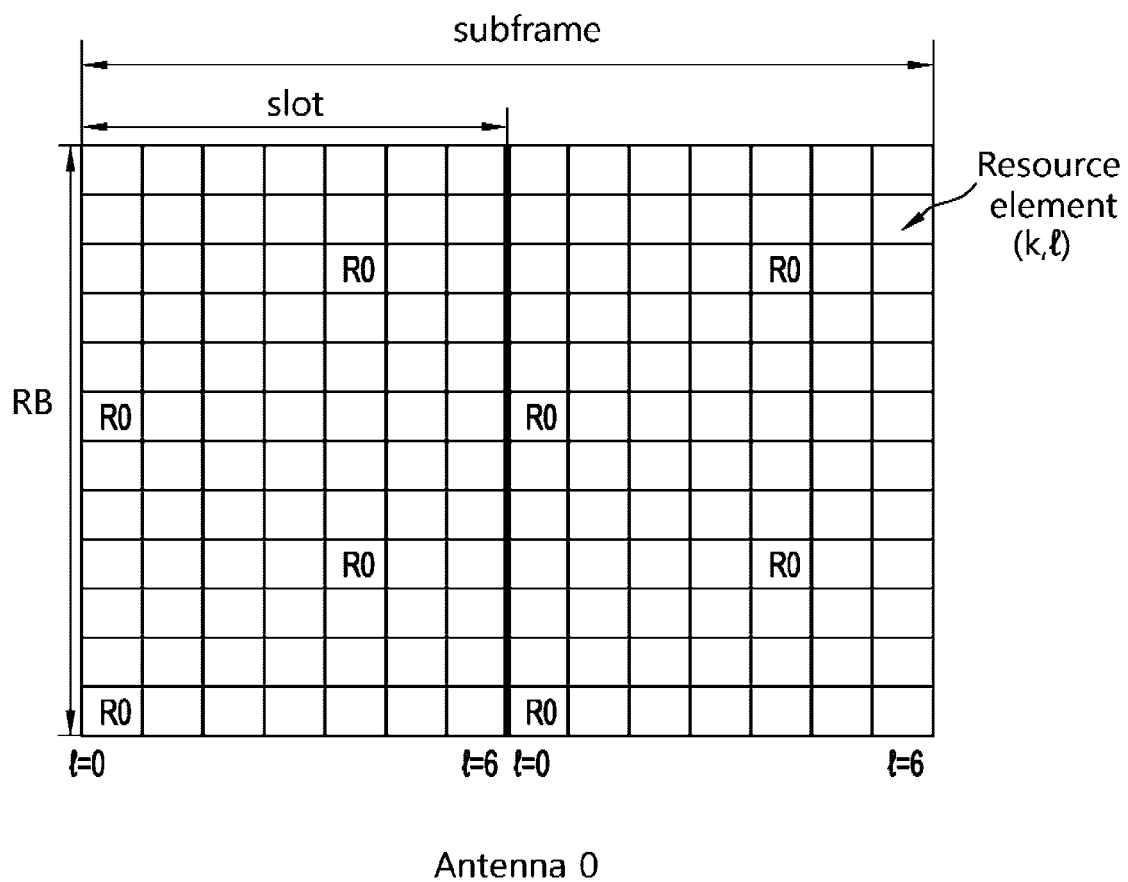
FIG. 6 illustrates an exemplary pattern in which a Cell-specific Reference Signal (CRS) is mapped to a resource block (RS) in a case where a base station uses a single antenna port.

FIG. 6 shows an exemplary pattern in which a CRS is mapped to an RB in a case where a base station uses a single antenna port.

Referring to FIG. 6, R0 indicates an RE onto which a CRS transmitted by antenna port 0 of the base station is mapped.

A CRS is transmitted by every downlink subframe in a cell that supports transmission of a PDSCH. The CRS may be transmitted over antenna port 0 or antenna port 3, and may be defined only with respect to $\Delta f$=15 kHz. A pseudo-random sequence rl,ns(m), which is generated from a seed value based on a cell ID (identity), is mapped as a complex-valued modulation symbol a(p)k,l. Here, ns indicates a slot number of a single wireless frame, p indicates an antenna port, and l indicates a OFDM symbol number within a slot. k indicates a subcarrier index. l,k is expressed as shown in the following Equation.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$v_{shift} = N_{ID}^{cell} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In the above equation, p indicates an antenna port, ns indicates slot number 0 or 1.

k has six indexes that are shifted according to a cell ID (NCell ID). Thus, cells having cell IDs which are a multiple of 6, such as 0, 6, 12, . . . , transmit a CRS at the same subcarrier location k.

In the above equation, l is determined by antenna port p, and an available value of l is 0, 4, 7, and 11. Thus, a CRS is transmitted on a symbol of 0, 4, 7, or 11.

An RE allocated to a CRS of a single antenna port is not able to be used for transmission of a different antenna port, and should be set as zero. In addition, in a MBSFN (multicast-broadcast single frequency network) subframe, a CRS is transmitted in a non MBSFN region.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only, the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed.

For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

<Multimedia Broadcast/Multicast Service (MBMS)>

A MBMS is a technique for simultaneously transmitting a data packet to a plurality of user.

According to the MBMS, when a specific number of users or more exists in the same cell, the users may receive the same multimedia data using a common resource (or channel), and thus efficiency of wireless resources may increase and the users may utilize a multimedia service with low costs.

The MBMS utilizes a common channel so that a plurality of terminals efficiently receives data of a single service. For a single service data, a base station allocates only a single common channel to a call, rather than allocating dedicated channels as many as the number of terminals that wish to receive the service. In addition, the plurality of terminals receives the common channel at the same time, thereby increasing efficiency of wireless resources. Regarding a MBMS, a terminal is able to receive the MBMS after receiving system information about a corresponding cell. However, the terminal is not able to be aware of information about a neighboring cell, and thus, there is a problem that it is difficult to receive the MBMS service in the neighboring cell.

Figure 7A:
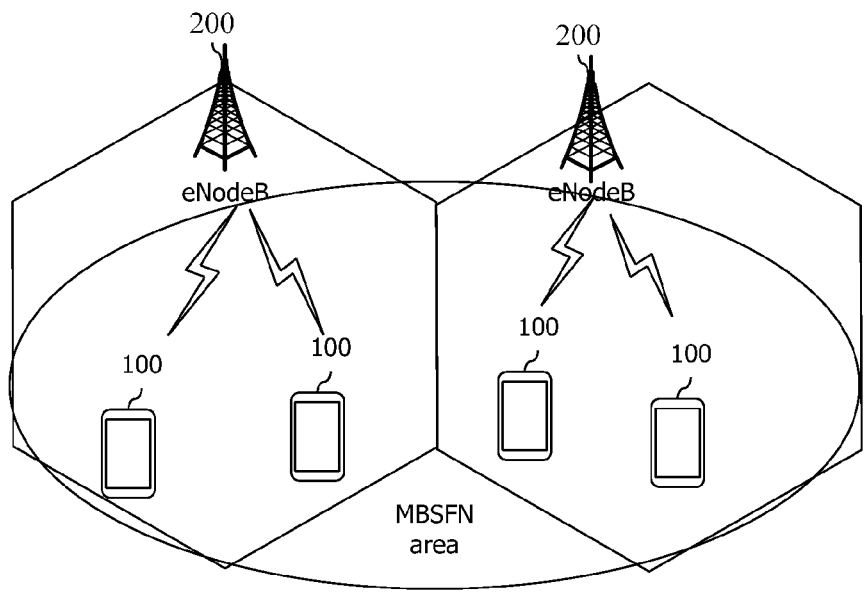
FIG. 7A illustrates an example of a Multimedia Broadcast/Multicast Service (MBMS).

FIG. 7A shows an example of a MBMS (Multimedia Broadcast/Multicast Service).

As found referring to FIG. 7A, an MBMS over a Single Frequency Network (MBSFN) is applied in a single service area, the MBSFN which enables a plurality of eNodeBs 200 to transmit the same data at the same time in the same format.

The MBMS indicates providing a streaming service, a background broadcast service, or a multicast service to a plurality of UEs by using a MBMS bearer service. At this point, the MBMS may be divided into a multi-cell service for providing the same service to a plurality of cells and a single cell service for providing a service to a single cell.

As such, when a terminal receive the multi-cell service, the terminal may receive the same by combining the same multiple-cell service transmission transmitted by multiple cells using an MBSFN technique.

Figure 7B:
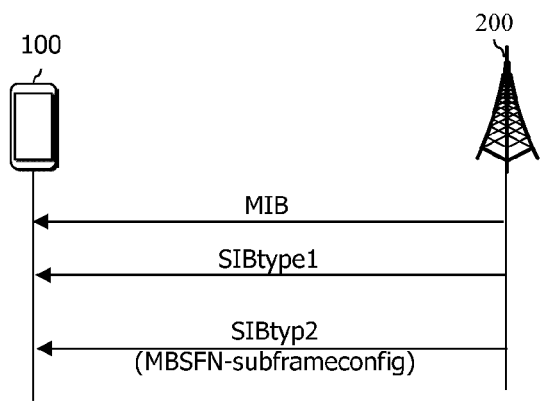
FIG. 7B illustrates an example in which a base station transmits configuration information of a MBMS over a Single Frequency Network (MBSFN) subframe to User Equipment (UE)
Figure 7C:
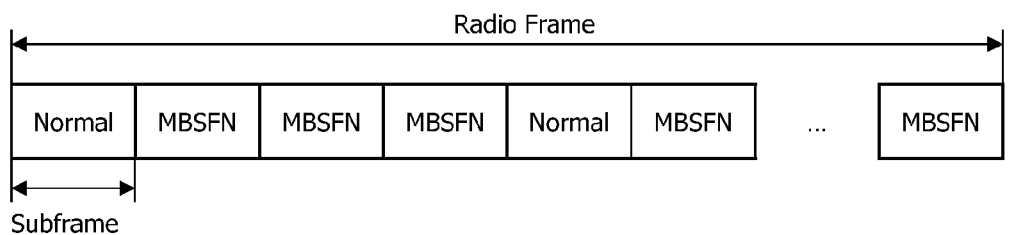
FIG. 7C illustrates an example of an MBSFN subframe.

FIG. 7B shows an example in which a base station transmits configuration information of an MBSFN subframe to an UE, and FIG. 7C shows an example of an MBSFN.

Referring to FIG. 7B, the base station transmits system information by separating the same into a mater information block (MIB) and a plurality of system information blocks (SIBs). The MIB includes the most important physical layer information. The SIBs includes various types. The first-type SIB (that is, SIB type1) includes information used to verification of whether an UE is allowed to access a cell and scheduling information of a different-type SIB. The second-type SIB (SIB type2) includes common and shared channel information. The third-type SIB primarily includes cell reselection information related to a serving cell. The fourth-type SIB includes information on a frequency of a serving cell, and information on an intra-frequency of a neighboring cell related to cell reselection. The fifth-type SIB (SIB type5) includes information on a different E-UTRA frequency, and information on an inter-frequency of a neighboring cell related to cell reselection. The sixth-type SIB (SIB type) includes information on an UTRA frequency and information on an UTRA neighboring cell related to cell reselection. The seventh type SIB (SIB type7) includes information on a GERAN frequency related to cell reselection.

The second-type SIB (SIB type2) includes information on a subframe set as an MBSFN. The information on a subframe set as an MBSFN may be expressed as a bit map.

As found referring to FIG. 7C, the information on a subframe set as an MBSFN indicates a subframe which is set as an MBSFN among ten subframes of a wireless frame.

<Cooperative Multi-Point Transmission/Reception (CoMP)>

Meanwhile, Cooperative Multi-point transmission/reception (CoMP) will be hereinafter described The CoMP indicates a cooperative communication technique between nodes (points). In a multi-cell and distributed multi-node system, the CoMP may be applied to reduce inter-cell interference. In a single cell and distributed multi-node system, the CoMP may be applied to reduce intra-cell inter-point interference. If using the CoMP, a UE is able to be provided with support of data from multiple nodes. If using the CoMP, each base station may support one or more UEs at the same time using the same radio frequency resource in order to improve system performance. In addition, if using the CoMP, a base station may implement a Space Division Multiple Access (SDMA) technique based on state information of a channel between the base station and a UE.

The primary object of the CoMP is to improve communication performance of cell boundary UEs or node boundary UEs.

Figure 8:
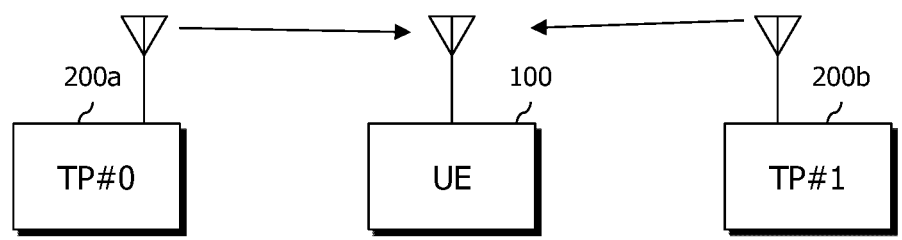
FIG. 8 illustrates an example of Cooperative Multi-point transmission/reception (CoMP).

FIG. 8 shows an example of the CoMP.

Referring to FIG. 8, there are two transmission points TP 200a and 200b, and an UE 100. Each of the two transmission points TP 200a and 200b may be an eNodeB or a Remote Radio Head (RRH). In other words, the two transmission points TP may be a combination of a macro base station and a macro base station, a combination of a macro base station and a small base station, or a combination of a small base station and a small base station.

Meanwhile, in such a CoMP situation, in the assumption that a channel characteristic experienced by a symbol transmitted by a transmission point (e.g., a first antenna port) is able to be inferred from a channel characteristic experienced by a symbol transmitted by a different transmission point (e.g., a second antenna point), it can be said that the two transmission points (e.g., two antenna ports) are quasi co-located. Here, the characteristics mean a broad range of characteristics. The broad range of characteristics include at least one of delay spread, Doppler spread, Doppler shift, average gain, and average delay.

If an UE is set by serving cell as any one of transmission modes 8 to 10 shown in Table 1, the UE may assume that antenna ports 7-14 of the serving cell are quasi co-located on a given subframe with respect to delay spread, Doppler spread, Doppler shift, average gain, and average delay.

Alternatively, if a UE is set by a serving cell as any one of transmission modes 1 to 9 shown in Table 1, the UE may assume that antenna ports 0-3, 7, and 7-22 of the serving cell are quasi co-located with respect to Doppler shift, Doppler spread, average gain, and delay spread.

If an UE is set by a serving cell as transmission mode 10 shown in Table 1, the UE may be set as any one of the following two quasi co-located types according to QCl-Operation, which is an upper layer parameter for demodulation of a PDSCH, in a transmission scheme related to the antenna ports 7-14.

Type A: the UE assumes that the antenna ports 0-3 and 7-22 of the serving cell are quasi co-located with respect to delay spread, Doppler spread, Doppler shift, and average delay.

Type B: the UE assumes that the antenna ports 15-22, which correspond to CSI-RS resource configuration distinguished by upper layer parameter CSI-RS-ConfigNZPId-r11, and the antenna ports 7-14, which are related to a PDSCH, are quasi co-located with respect to Doppler shift, Doppler spread, average gain, and delay spread.

On the other hand, a serving cell may transmit settings on the quasi co-location to an UE by using DCI format 2D shown in Table 2. Specifically, the DCI format 2D may include a 2-bit PDSCH RE Mapping and Quasi-Co-Location Indicator field (hereinafter, referred to as a PQI field). The PQI field may indicate any one of parameter sets 1-4 set configured an upper layer, as shown in the following.

TABLE 3

| PQI Field Value | Description |
| --- | --- |
| '00' | Parameter Set 1 set in an upper layer |
| '01' | Parameter Set 2 set in an upper layer |
| '10' | Parameter Set 3 set in an upper layer |
| '11' | Parameter Set 4 set in an upper layer |

The above parameter sets may include the following parameter combinations.
  crs-PortsCount: the number of antenna ports for a CRS
  mbsfn-SubframeConfigList: a subframe reversed for an MBSFN
  csi-RS-ConfigZPId: a CSI-RS resource configuration which an UE considers zero power transmission.
  pdsch-Start: a location of a start OFDM symbol of a PDSCH
  qcl-CSI-RS-ConfigNZPId: a CSI-RS resource that is quasi co-located with a PDSCH antenna port If the UE is set as the aforementioned type B, the UE determines remapping of the PDSCH, and utilizes any one parameter set depending on a value indicated in a PQI field included in DCI format2 of PDCCH in order to determine a quasi co-located antenna port of the PDSCH.

<Introduction of Small Cell>

Meanwhile, a small cell having a narrow cell coverage is expected to be added to a next-generation mobile communication system and process more traffics. The existing cell has a large coverage compared to the small cell, and thus, it is called a macro cell. Hereinafter, descriptions will be provided with reference to FIG. 7.

Figure 9:
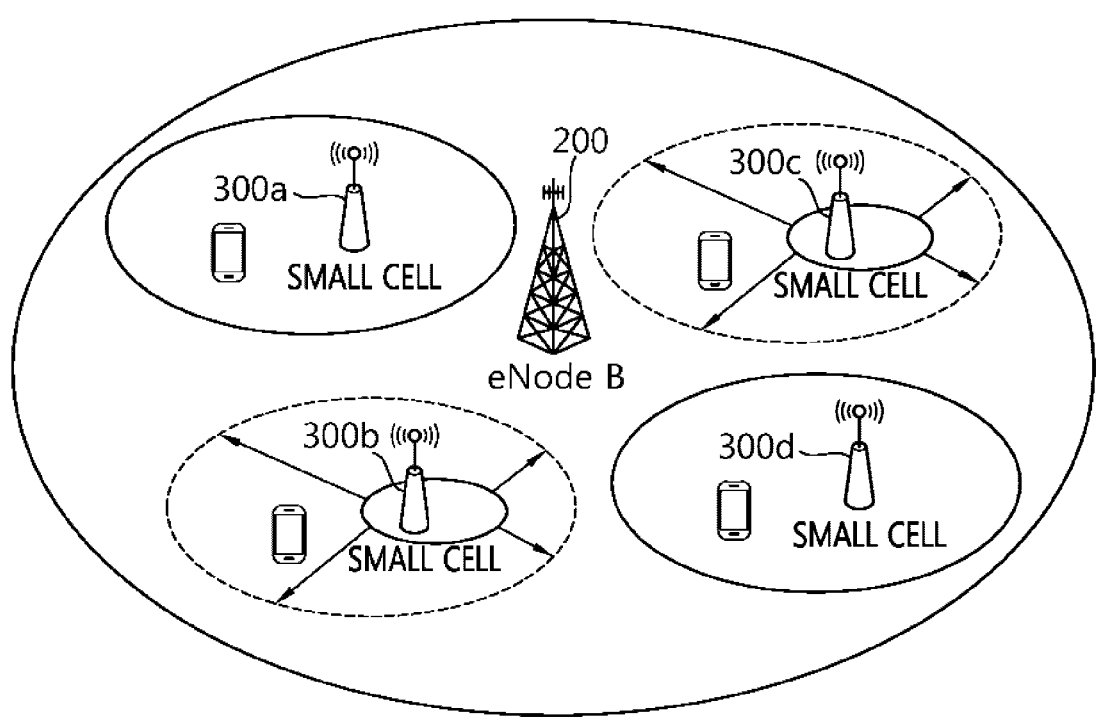
FIG. 9 is a diagram illustrating a heterogeneous network environment which is expected to become a next-generation wireless communication system and in which a macro cell and small cells are used together.

FIG. 9 is a diagram illustrating a heterogeneous network environment which is expected to become a next-generation wireless communication system and in which a macro cell and small cells are used together Referring to FIG. 9, there is shown a heterogeneous network environment in which a macro cell by an existing base station 200 overlaps one or more small base stations 300a, 30b, 300c, and 300d. The existing base station provide a large coverage compared to the small base stations, so it is called a macro base station (Macro eNodeB, MeNB). Throughout this specification a macro cell and a macro base station are used interchangeably. An UE accessing the macro cell 200 may be called a macro UE. The macro UE receives a downlink signal from the macro base station, and transmits an uplink signal to the macro base station.

In such a heterogeneous network, the macro cell is set as a primary cell (Pcell) and the small cell is set as a secondary cell (Scell) so that a loophole of the coverage of the macro cell may be filled up. In addition, if the small cell is set as a primary cell (Pcell) and the macro cell is set as a secondary cell (Scell), the overall performance may be boosted.

However, suppose that a significantly large number of small cells are arranged in a specific area and the UE moves within the specific area. Then, the UE has to perform handover frequently. Thus, overhead may be caused by a handover procedure.

Detailed Embodiments of the Present Disclosure

Therefore, one embodiment of the present disclosure proposes a method in which a plurality of small cells operates as a single large cell. In the present disclosure, such a scheme is referred to as an amorphous cell.

Figure 10:
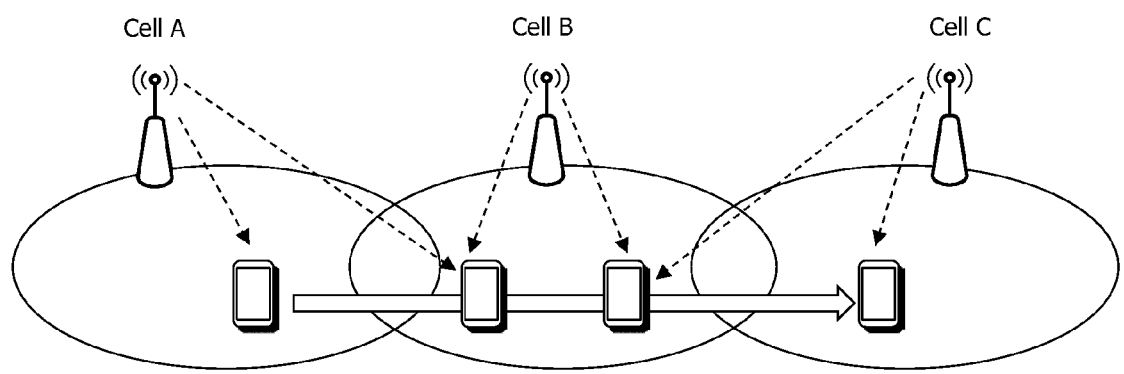
FIG. 10 illustrates a concept of an amorphous cell according to the present disclosure.

FIG. 10 illustrates a concept of an amorphous cell according to the present disclosure.

Referring to FIG. 10, a plurality of small cells is arranged. In this situation, suppose that an UE moves from Cell A through Cell B to Cell C. At this point, if the UE recognizes Cell A, Cell B, and Cell C as a single large cell, the UE does not need to perform a handover procedure. Therefore, it is possible to prevent an overhead which may be caused by the handover procedure.

As such, to make the UE to recognize Cell A, Cell B, and Cell C as a single large cell, a scheme using the CoMP technique or a scheme by which the cells (or TPs) emulates a different cell (or a different TP) to operate as the same may be employed.

The scheme using the CoMP technique expands an existing CoMP operation (that is, transmission mode 10), thereby enabled to rapidly change into a TP suitable for communication in response to movement of the UE. In addition, the emulating scheme is a method in which, while supporting its UE, Cell B operates like Cell A for a specific UE when the specific UE moves from Cell A to Cell B.

Hereinafter, the scheme of expanding the CoMP technique and the emulating scheme will be described in detail.

1. The First Embodiment of the Present Invention: Scheme of Expanding the CoMP Technique The first embodiment of the present disclosure suggests a scheme of expanding the CoMP technique in order to realize an amorphous cell.

Figure 11:
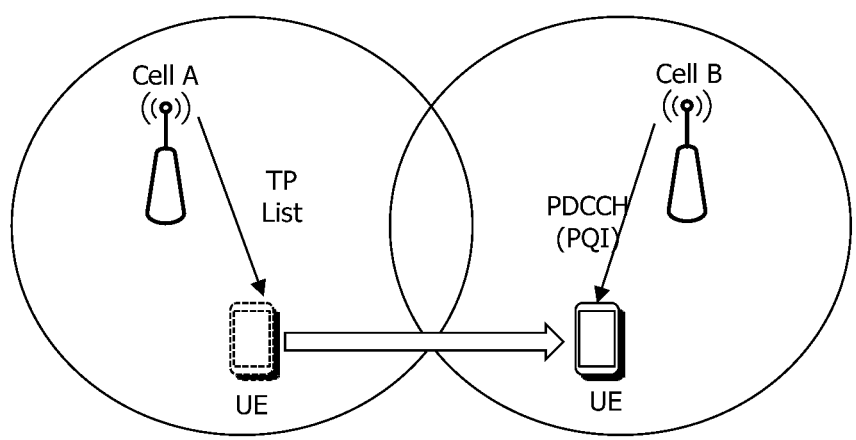
FIG. 11 is a diagram conceptually illustrating an example of a scheme according to a first embodiment of the present disclosure.

FIG. 11 is a diagram conceptually illustrating an example of a scheme according to the first embodiment of the present disclosure.

According to the first embodiment of the present disclosure, as found referring to FIG. 10, Cell A establishes CoMP with Cell B. Then, together with Cell B, Cell A generates a TP list. At this point, the TP list includes Cell A and Cell B. Then, if an UE moves from Cell A to Cell B, Cell A or Cell B sets a PQI field as DCI format 2D and transmits a PDCCH to the UE.

Then, according to the setting of the PQI field, the UE may dynamically determine whether to receive data from Cell A or Cell B.

However, if small cells are arranged densely, the number of cells needed to be included in the TP list may increases dramatically. At this point, the PQI field may need to indicate more parameter sets.

In order to solve this problem, a base station or a network may consider requesting the UE (1) to set multiple TP lists or a list for multiple PQI fields, or (2) to expand a 2-bit PQI field with reference to the existing Rel-12 standard. Alternatively, (3) the base station or the network may, if necessary, update a list for a value included in the PQI field, while maintaining the 2-bit PQI field defined by the Rel-12 standard. At this point, the TP list may be updated when necessary. For example, the base station or the network may generate TP list # including cells/TPs located at the center of the network, a PQI field value list #1 corresponding to the TP list 1#, a TP list #2 including cells/TPs in a specific outer direction from the center, and a PQI field value list #2 corresponding to the TP list #2. Similarly, a TP list #3 and a PQI field value list #3 corresponding thereto may be generated, and a TP list #4 and a PQI field value list #4 corresponding thereto may be generated. In addition, according to a moving direction of an UE, the network or the base station may use a suitable TP list and a PQI field value list corresponding thereto.

Alternatively, it is possible to consider that UE sets a PQI field value list or a TP list, and then transfer the same to a network or a base station. For example, the UE may set a TP list or a PQI field value list based on RRM measurement, and transmit information on the corresponding list to the base station. At this point, the UE may first transmit an RRM report value corresponding to each item of the TP list, and the base station may update the PQI field value list or the TP list based on the received RRM report value. For example, if the UE includes TP#1, TP#2, TP#3, and TP#4 in a TP list and set a PQI field value list corresponding to the TP list, it is possible to consider transmitting RBM measurements on TP#1, TP#2, TP#3, and TP#4 to a most significant bit (MSB) when reporting RRM.

Next is a more detailed embodiment about how to select a PQI field value list/table.

In the first example, a network transmits a PQI list/table for use as an L1/L2 signal to an UE. The PQI list/table for use may be interpreted as a list/table referenced by a PQI field value in DCI. For instance, a network may transmit a plurality of PQI lists/tables to an UE through an upper layer. Then, the network estimates location information, direction information, or a variance in RRM measurement of the UE, designate one of the plurality of PQI lists/tables as an L1/L2 signal, and transmit the estimated information to the UE using the L1/L2 signal. Alternatively, the network may generate a raw PQI list/table having an extended size, and perform down-sampling through the L1 signal. The L1 signal may be DCI.

In second example, according to a PQI field value transmitted to an UE through DCI, a PQI field value list/table may be updated. For example, it is possible to set a different PQI value list/table, which is set in advance in an upper layer, to interlock with each item of a 2-bit PQI field value list. More specifically, suppose that the current PQI field value list/table includes pqi0, pqi1, pqi2, and pqi3, and that pqi1 is set to interlock with a PQI list/table including pqi1, pqi4, pqi5, pqi6. In this case, if a network selects pqi1 N times and transmit a PDSCH to a specific UE, the network and the UE may set a PQI list/table including pqi1, pqi4, pqi5, pqi6 in DCI, the list which corresponds to pqi1.

In the third example, a PQI list/table may be updated based on a location of a corresponding UE. A location of a UE may be informed by a network, and a PQI list/table may be updated by a standard that is predetermined or preset according to the location of the UE.

In the fourth example, a PQI, list/table may be updated based on RRM measurement of a corresponding UE. In this case, by utilizing an RRM measurement to be reported to a base station, the UE is able to update the PQI list/table based on a resource known to both of the UE and the network.

II. The Second Embodiment of the Present Disclosure: Emulating Scheme

The second embodiment of the present disclosure proposes a scheme in which a random cell emulates a different (neighboring) cell to transmit a signal, thereby enabled to operate as the different cell.

Figure 12:
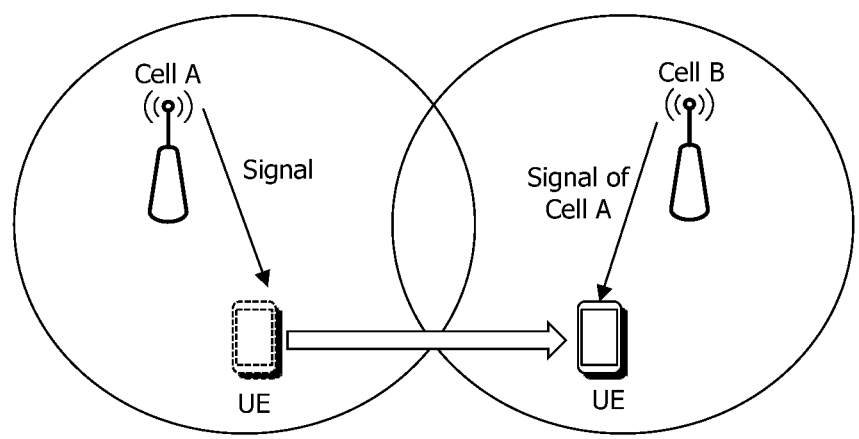
FIG. 12 is a diagram conceptually illustrating an example of another scheme according to a second embodiment of the present disclosure.

FIG. 12 is a diagram conceptually illustrating an example of another scheme according to the second embodiment of the present disclosure.

Referring to FIG. 12, if an UE approaches from Cell A to Cell B, Cell B emulates Cell A and transmits a signal. Herein, for convenience of explanation, the cell attempt to emulate is called an emulation cell, and the cell to be emulated is called a target cell.

Meanwhile, when the emulation cell transmits a cell of the target cell, the UE needs recognize the signal, transmitted by the target cell, as a signal transmitted by the emulation cell.

Meanwhile, TDM, FDM, superposition coding, and the like may be considered as a way to enable the emulation cell not only to transmit a signal to its own UE, but to transmit a signal to an UE of the target cell as if the emulation cell were the target cell.

If Cell B performs an operation for its own UE and an operation of emulating the target cell for an UE of Cell A simultaneously or separately, Cell B may perform signaling to inform the UE of Cell A of information as to whether it is the emulation cell and whether it is now performing an emulating operation. In addition, the information may be shared between base stations through a backhaul. Based on the above information, the UEs may be set to operate differently.

Meanwhile, according to the existing LTE Re-12 system standard, a CRS is transmitted by generating a sequence based on a physical cell ID (PCID) and performing RE mapping. The CRS may be used to measure quality of a cell, and may be used to decode a control channel, such as PCFICH, PHICH, and PDCCH. Thus, there may be a difference in use of the scheme of emulating a control channel based on CRS in a case where an emulation cell transmits both of its own CRS and a CRS of a target cell (when two CRS exist) and in a case where the emulation cell transmits only its own CRS (that is, multiple CRSs do not exist).

Therefore, hereinafter there is provided descriptions of each of the cases: (1) a scheme for a case where an emulation cell transmits only its own CRS, and (2) a scheme for a case where an emulation cell transmits not just its own CRS, but a CRS of a target cell.

II-1. A Case where an Emulation Cell does not Transmit a CRS of a Target Cell.

If an emulation cell does not transmit a CRS of a target cell, an UE moving from the target cell (the first cell) to the emulation cell (the second cell) may assume that the CRS of the emulation cell is the CRS of the target cell.

As such, in order to enable the UE to assume that a CRS of the emulation cell is a CRS of the target cell, (1) the target cell (the first cell) and the emulation cell (the second cell) may be set to have the same vshift value through cell planning, (2) the target cell (the first cell) and the emulation cell (the second cell) may be set to have the same modulo 3 value for a vshift value through cell planning, (3) if an emulating operation is set through an upper layer signal or a backhaul signal, vshift according to a PCID may be not to be performed between the target cell (the first cell) and the emulation cell (the second cell). Alternatively, whether to apply vshift may be set in an upper layer, or a set value may be shared between the two cells by a backhaul signal again.

Meanwhile, as described above, in a case where the emulation cell transmits only its own CRS without transmitting a CRS of the target cell, it may affect demodulation by the UE of a channel, such as PCFICH, PHICH, and PDCCH, based on a CRS. Specifically, if the emulation cell uses its own CRS sequence rather than a CRS sequence of the target cell, a channel coefficient estimated by the UE may be different from an actual channel coefficient. Thus, the emulation cell may consider transmitting each channel, by considering that the CRS sequence transmitted by itself is different from a sequence found by the UE through channel estimation.

Meanwhile, a scheme in which an UE performs channel estimation using a CRS may be changed as below: (1) a UE receives a CRS of an emulation cell, which is transmitted by the emulation cell; (2) the UE assumes that the CRS of the emulation cell is a CRS of the target cell, and estimates a channel coefficient for each CRS RE; and (3) the UE performs channel estimation for a corresponding RB by employing interpolation, extrapolation, and the like based on the value estimated for each CRS RE. At this point, the result of the channel estimation may be time and/or frequency selective even in a flat channel environment.

Hereinafter, a scheme for each control channel will be described.

(A) PCFICH

PCFICH is a physical channel including CFI, and indicates a number of OFDM symbols to represent the size of a control region in a subframe. Accordingly, a region where PCFICH, PHICH, PDCCH, and the like are mapped and a region where PDSCH or EPDCCH is mapped may be indicated. For an UE, the same CFI value between a target cell (an existing serving cell) and an emulation cell is not guaranteed. In particular, scrambling and RE mapping is performed differently for PCFICH according to a PCID value, so an additional emulating operation may be needed. In addition, because a CRS of the target cell is not transmitted, it may be inappropriate to demodulate a PCFICH based on a result of channel estimation. Next is a more detailed example of how to process a PCFICH.

An emulation cell transmits only a PCFICH for its own. In this case, if an UE of a target cell, which the emulation cell has to support, fails to detect a PCFICH, the UE of the target cell set a preset value as 1_start. The preset value may indicate a PDSCH start point and an EPDCCH start point.

The two points may be set (independently) differently. Alternatively, if information about the emulation cell is set in the UE, the UE may not attempt to detect the PCFICH and instead may use a PDSCH start point and/or an EPDCCH start point which is set in advance or set in an upper layer.

(B) PDCCH

When an emulation cell transmits a PDCCH of a target cell, a scrambling ID or CRC masking may be performed using a PCID for the target cell. To this end, it is assumed that the emulation cell and the target cell facilitate the same method of configuring an REG. When the emulation cell transmits a PDCCH of the target cell, there may be inconsistency in results of channel estimation between an UE and the emulation cell. Thus, when transmitting the PDCCH of the target cell, the emulation cell may change power of each RE based on a CRS sequence of the emulation cell and a CRS sequence of the target cell. However, this may increase complexity while degrading performance. Thus, another approach may be used, in which if information about the emulation cell is set in the UE, control information is transmitted only through a DMRS-based EPDDCH. In this case, the UE having the information about the emulation cell may not perform PDCCH monitoring. In another example, a PDCCH transmitted by the emulation cell may be set to be demodulated based on DMRS. In another example, transmission power for each RE with respect to the PDSCH may be changed based on a CRS sequence of the emulation cell and a CRS sequence of the target cell.

II-2. A Case where a CRS of an Emulation Cell and a CRS of a Target Cell are all Transmitted Using FDM The emulation cell may transmit both of its own CRS and a CRS of the target cell using FDM. An exemplary scheme for allowing the CRS of the target cell and the CRS of the emulation cell may be setting vshift values differently. To set vshift values of the target cell and the emulation cell differently, (1) cell planning may be used, and (2) a vshift value may be dynamically set so that the target cell and the emulation cell do not have the same vshift value. To this end, cells may share vshift values through a backhaul signal, and accordingly an emulation cell suitable for a target cell may be designated. In addition, an UE recognizing a target cell as a serving cell may detect a CRS corresponding to the target cell even from the emulation cell.

To transmit a CRS corresponding to a plurality of cells, the emulation cell needs to determine how to configure an REG in an OFDM symbol including the CRS, and whether to use such an REG. For example, in a case where a CRS having vshift of 0 and a CRS having vshift of 2 are transmitted by the emulation cell at the same time, an REG corresponding to the emulation cell and an REG corresponding to the target cell both include each other's CRS. Thus, an OFDM symbol including a CRS may be excluded from RE mapping for a control channel. In this case, an REG or CCE corresponding to an OFDM symbol including a CRS may be excluded from monitoring of a control channel by an UE.

Hereinafter, operation of each control channel will be described.

(A) PCFICH

According to the existing LTE Rel-12 system, a PCFICH is transmitted on the first OFDM symbol of a subframe. In this case, the OFDM symbol includes a CRS. That is, to perform an emulating operation, it may be difficult for the target cell to transmit a PCFICH. Thus, a PCFICH of a cell set to be emulated may not be transmitted. Instead, the emulation cell may information on size of a control region to an UE using an upper layer signal. The upper layer signal may include a PDSCH (or EPDCCH) start point (which is, for example, indicated as 1_start). Meanwhile, if an UE requiring emulating operation fails to detect a PCFICH, the emulation cell may transmit the upper layer signal to the UE. Alternatively, an index of REGs to which the PCFICH is to be transmitted, or RE mapping information may be managed in advance or may be set in the upper layer. In addition, cells may share such information through a backhaul signal.

(B) PDCCH

When transmitting a PDCCH of a target cell, an emulation cell may utilize a PCID of the target cell for scrambling ID or CRC masking of the PDCCH. In addition, when performing RE mapping of the PDCCH, the emulation cell may perform REGs except for an OFDM including a CRS. For example, if the emulation cell has three or four APs, the emulation cell may not use an REG or CCE including the first and second OFDM symbols. The number of APs may be interpreted as the number of antenna ports which the emulation cell uses to transmit a PBCH. More specifically, when determining REGs that composes of a CCE, the emulation cell may exclude REGs used for a PCFICH and a PHICH, and an REG corresponding to an OFDM symbol including a CRS. Based on the above, the UE may re-define a search space for monitoring a PDCCH.

(C) PDSCH/EPDCCH

In a case where an emulation cell transmits its own CRS and a CRS of a target cell using FDM (that is, when two CRSs coexist in the FDM form), the CRS of the target cell may occupy an RE to which PDSCH or EPDCCH is to be mapped. The following are specific examples of RE mapping of a PDSCH or EPDCCH.

In the first example, the emulation cell transmits only its own CRS in a region where data is to be mapped, without the CRS of the target cell. In this case, RE mapping of a PDSCH or n EPDCCH is performed with respect to the emulation cell. The PDSCH may be limited to correspond to a TM which operates based on DMRS. In addition, subframes transmitted by a PDSCH/EPDCCH corresponding to the target cell may be managed in an additional set form. The subframe set may be an MBSFN subframe. During an emulating operation, the CRS RE location information may be informed to an RE using an upper layer signal.

In the second example, the emulation cell even may transmit its own CRS and a CRS of the target cell in a region where data is to be mapped. In this case, the emulation cell transmits a PDSCH/EPDCCH by puncturing an RE value corresponding to a location of the CRS of the target cell. Using an upper layer signal, the emulation cell may inform an UE of the CRS RE location information to be punctured.

In the third example, the emulation cell may transmit a CRS of the target cell in addition to its own CRS in a region where data is mapped. In this case, to transmit an EPDCCH, the emulation cell may puncture an RE corresponding to a location of the CRS of the target cell. Meanwhile, to transmit a PDSCH, the emulation cell may perform rate-matching in consideration of an RE corresponding to the location of the CRS of the target cell. At this point, the emulation cell may transmit the CRS RE location information to an UE using an upper layer signal.

II-3. A Case where a CRS of an Emulation Cell and a CRS of a Target Cell are Both Transmitted Using TDM The emulation cell is able to transmit its own CRS and the CRS of the target cell using TDM. That is, the emulation cell first transmits its own CRS, and then transmit the CRS of the target cell.

Figure 13:
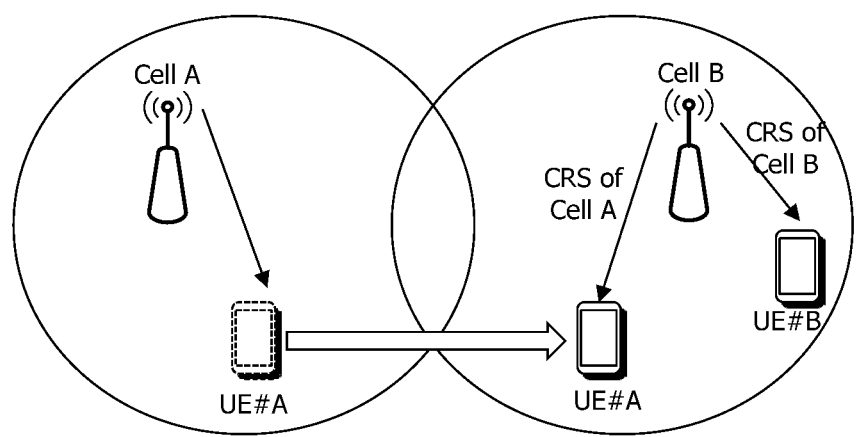
FIG. 13 is a diagram conceptually illustrating an example of how an emulation cell transmits its own CRS and a CRS of a target cell together using TDM according to the second embodiment of the present disclosure.

FIG. 13 is a diagram conceptually illustrating an example of how an emulation cell transmits its own CRS and a CRS of a target cell together using TDM according to the second embodiment of the present disclosure.

Referring to FIG. 13, if UE#A approaches from Cell A to Cell B, Cell B (an emulation cell) transmits a CRS of Cell A (a target cell) as if it were Cell A (the target cell). Then, Cell B (emulation cell) transmits its own CRS to UE#B which belongs to itself.

As such, in order to transmit the CRS of the emulation cell and the CRS of the target cell, the emulation cell may partition a subframe into a plurality of sets and designate a subframe set in which the emulation cell is able to operate as the target cell and transmit a signal.

An example of a subframe region in which the emulation cell is able to operate as the target cell is a subframe in which the mobile cell operates in an off state. The emulation cell may transmit signals including its own CRS in an on state, and transmit signals including the CRS of the target cell in an off state. When back to the off state, the emulation cell may not transmit in a region where a discovery signal of the emulation cell is transmitted a signal of the target cell.

Another example of a subframe region in which the emulation cell is able to operate as the target cell may be an MBSFN subframe or a subset thereof.

Figure 14:
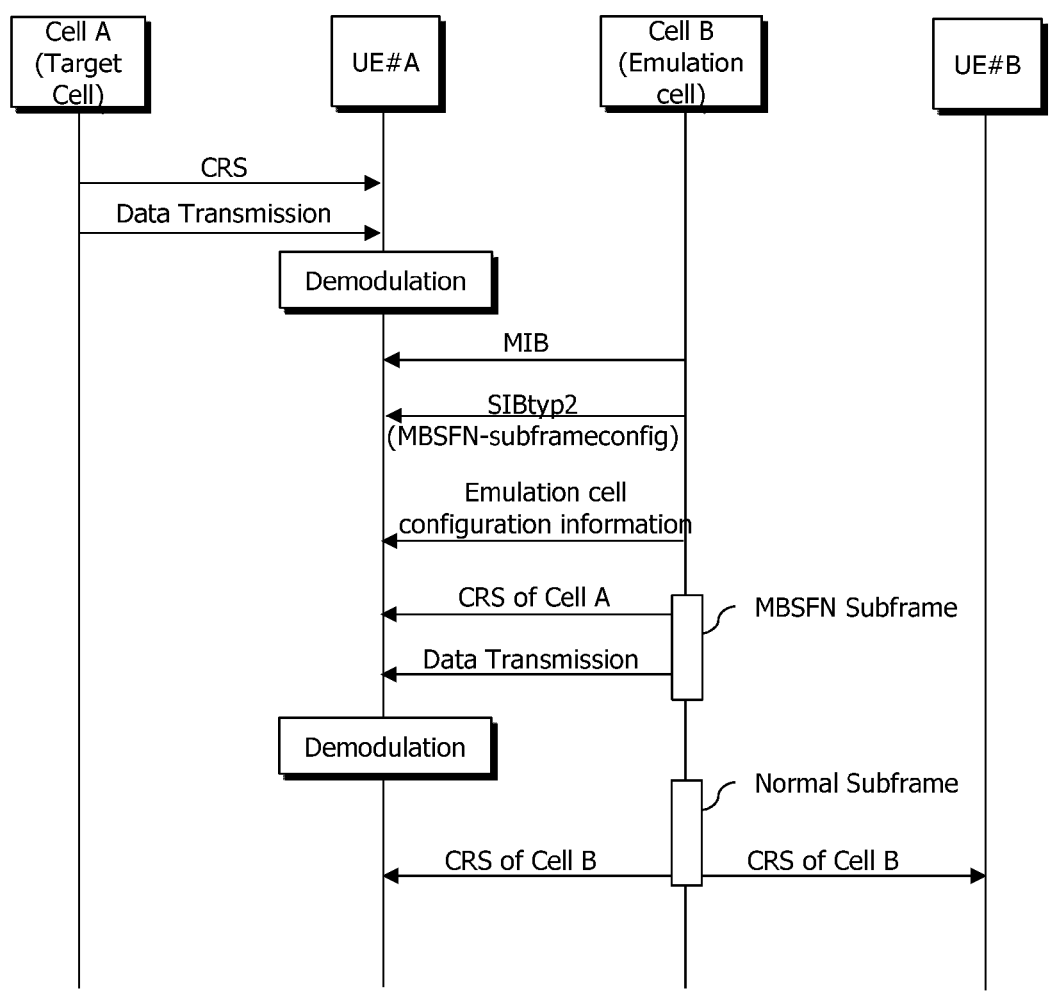
FIG. 14 is a diagram specifically illustrating an example of how an emulation cell transmits is CRS and a CRS of a target cell together using TDM according to the second embodiment of the present disclosure.

Detailed description thereof is provided with reference to FIG. 14.

FIG. 14 is a diagram specifically illustrating an example of how the emulation cell transmits its own CRS and a CRS of the target cell using TDM according to the second embodiment of the present disclosure.

As found referring to FIG. 14, UE#A demodulates data received from Cell A based on a CRS received from Cell A. Then, EU#A moves from Cell A to Cell B. Cell B broadcasts an MIB and an SIB. SIBtype2 of the SIB includes configuration information of MBSFN subframes. According to the configuration information, a subframe in which Cell B (the emulation cell) is able to operate as Cell A (the target cell) is indicated.

In addition, Cell B transmits, to UE#A, configuration information as to whether it is possible to perform an emulating operation.

Based on the configuration information, UE#A checks whether Cell B operates as the emulation cell. If Cell B operates as the emulation cell, UE#A receives a CRS of Cell A and a data channel from Cell B using at least one MBSFN subframe. Then, UT#A demodulates the data channel based on the CRS of Cell A received from Cell B.

Meanwhile, Cell B transmits its own CRS on a normal subframe other than the MBSFN subframe.

In the case where the emulation cell transmits a signal corresponding to the target cell by designating an MBSFN subframe, it is possible to consider transmitting the CRS of the emulation cell on the first two OFDM symbols of the MBSFN subframe. In this situation, a PDCCH of the target cell may be converted into the form of an R-PDCCH which a base station transmits to a relay node.

II-4. A Case where a CRA of an Emulation Cell and a CRS of a Target Cell are Coded in a Superimposed Manner.

As vshift values of cells have been set to be the same through cell planning in order for the emulation cell to transmit its own CRS and the CRS of the target cell, the emulation cell may make the two CRSs superimposed. Being superimposed may indicate superposition coding that is a transmission scheme by which actual signals are transmitted with different power rates. In this case, an UE may perform Interference Control (IC) to distinguish the two CRSs.

Hereinafter, operations for each control channel will be described.

(A) PCFICH

The emulation cell transmits its own PCFICH and a PCFICH of the target cell at the same time. For the simultaneously transmission, the emulation cell may perform superposition coding or FDM on the two PCFICHs in the same time/frequency resource. Based on a location at which the two PCFICH are mapped and on whether they are superimposed, the above two schemes may be used together. An UE may detect the PCFICH of the target cell through IC, and a corresponding value of the PCFICH of the target cell may inherit a Control Format Indicator (CFI) of the emulation cell.

(B) PDCCH

The emulation cell may perform superposition coding on its own control channel and/or reference signal (RS) and the target cell's control channel and/or reference signal (RS), and then transmit the result. In this case, an UE in which emulating operation is set may detect the control channel and reference signal of the target cell through IC operation.

Meanwhile, information on the target cell for superposition coding may be shared among cells by a backhaul signal. In addition, information required for an UE stage to perform IC may be transferred by an upper layer signal.

The FDM/TDM/superposition coding schemes may be used for each channel independently. For example, an emulation cell may transmit two CRSs by implementing the superposition coding scheme, and two PDCCH by implementing FDM.

The above-described embodiments of the present invention may be implemented using various means. For example, the embodiments of the present invention may be implemented by hardware, firmware, software, or a combination thereof. Detailed description thereof will be provided with reference to drawings.

Figure 15:
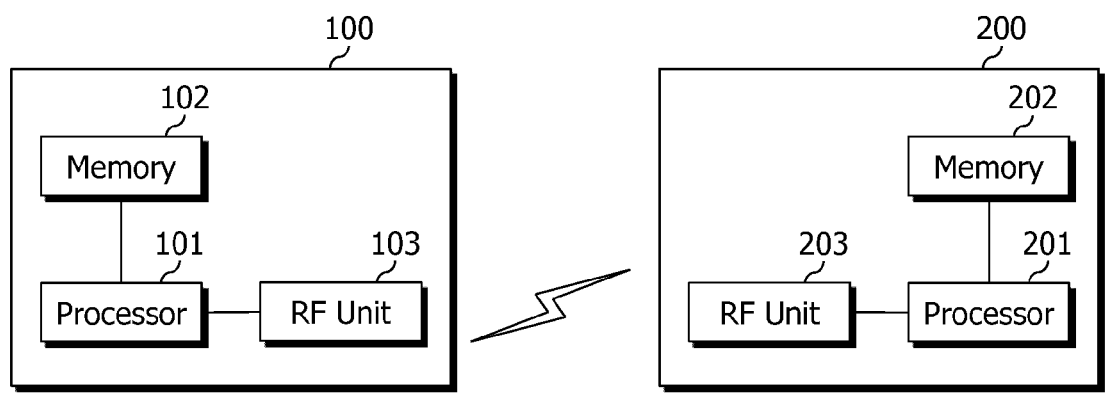
FIG. 15 is a block diagram illustrating a wireless communication system which implements embodiments of the present disclosure.

FIG. 15 is a block diagram illustrating a wireless communication system which implements embodiments of the present disclosure.

A base station includes a processor 201, a memory 202, and an radio frequency (RF) unit 203. The memory 202 is connected with the processor 201 to store various types of information required to drive the processor 201. The RF unit 203 is connected with the processor 201 to transmit and/or receive a wireless signal. The processor 201 implements the proposed functions, procedures, and/or methods. Operation of a base station in the above-described embodiments may be implemented by the processor 201.

An UE 100 includes a processor 101, a memory 102, and an RF unit 103. The memory 102 is connected with the processor 101 to store various types of information that is required to drive the processor. The RF unit 103 is connected with the processor 101 to transmit and/or receive a wireless signal. The processor 101 implements the proposed functions, procedures, and/or methods.

A processor may include an Application-Specific Integrated Circuit (ASIC), any other different chip set, a logical circuit, and/or a data processing device. A memory may include a read-only memory (ROM), a random access memory (RAM), a flash memory, a memory card, a storage medium, and/or any other storage device. An RF unit may include a baseband circuit for processing a wireless signal. When an embodiment is implemented by software, the aforementioned scheme may be implemented by a module (procedure, function, etc.) which performs the aforementioned functions. A module may be stored in the memory and implemented by the processor. The memory may be located inside or outside the processor, or may be connected with the processor by any of various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving a data channel, the method comprising
    receiving, from a first cell, a cell-specific reference signal (CRS) and a data channel;
    receiving, from a second cell, configuration information of a Multimedia Broadcast/Multicast Service (MBMS) over a Single Frequency Network (MBSFN) subframe, according to a movement from the first cell to the second cell;
    receiving, from the second cell, the CRS and the data channel of the first cell on at least one MBSFN subframe according to the configuration information; and
    demodulating the data channel, which is received from the second cell, based on the CRS of the first cell, which is received from the second cell,
    wherein the receiving of the CRS and the data channel of the first cell and the demodulating of the data channel are performed only when the second cell is able to operate as an emulation cell for mimicking the first cell.

2. The method of claim 1, further comprising:
    receiving, from the second cell, a CRS of the second cell in a normal subframe other than the MBSFN subframe.

3. The method of claim 1, further comprising:
    receiving the CRS of the second cell in first n number of orthogonal frequency division multiplexing (OFDM) symbols of the MBSFN subframe.

4. The method of claim 1, further comprising:
    receiving emulation cell configuration information from the second cell,
    wherein the emulation cell configuration information indicates that the second cell is able to operate as the emulation cell.

5. A user Equipment (UE) for receiving a data channel, the UE comprising:
    a Radio Frequency (RF) unit; and
    a processor configured to control the RF unit and perform:
        receiving, from a first cell, a cell-specific reference signal (CRS) and a data channel,
        receiving, from a second cell, configuration information of a Multimedia Broadcast/Multicast Service (MBMS) over a Single Frequency Network (MBSFN) subframe, according to a movement from the first cell to the second cell,
        receiving, from the second cell, the CRS and the data channel of the first cell on at least one MBSFN subframe according to the configuration information, and
    demodulating the data channel, which is received from the second cell, based on the CRS of the first cell, which is received from the second cell,
    wherein the receiving step of the CRS and the data channel of the first cell and the demodulating step of the data channel are performed only when the second cell is able to operate as an emulation cell for mimicking the first cell.

6. The UE of claim 5, wherein the processor receives, from the second cell, a CRS of the second cell in a normal subframe other than the MBSFN subframe.

7. The UE of claim 5, wherein the processor further receives the CRS of the second cell in first n number of orthogonal frequency division multiplexing (OFDM) symbols of the MBSFN subframe.

8. The UE of claim 5, wherein the processor further receives emulation cell configuration information from the second cell, and
    wherein the emulation cell configuration information indicates that the second cell is able to operate as the emulation cell.

* * * * *